(12) United States Patent
Huber et al.

(10) Patent No.: US 9,400,168 B2
(45) Date of Patent: Jul. 26, 2016

(54) DEVICE FOR DISTANCE MEASUREMENT

(71) Applicant: Dr. Johannes Heidenhain GmbH, Traunreut (DE)

(72) Inventors: Walter Huber, Traunstein (DE); Ralph Joerger, Traunstein (DE); Wolfgang Holzapfel, Obing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 174 days.

(21) Appl. No.: 13/916,753

(22) Filed: Jun. 13, 2013

(65) Prior Publication Data

US 2013/0335746 A1    Dec. 19, 2013

(30) Foreign Application Priority Data

Jun. 15, 2012 (DE) .......... 10 2012 210 079
Feb. 27, 2013 (DE) .......... 10 2013 203 211

(51) Int. Cl.
*G01B 11/02* (2006.01)
*G01B 9/02* (2006.01)

(52) U.S. Cl.
CPC ........ *G01B 9/02049* (2013.01); *G01B 9/02018* (2013.01); *G01B 9/02022* (2013.01); *G01B 9/02061* (2013.01); *G01B 11/026* (2013.01); *G01B 2290/30* (2013.01)

(58) Field of Classification Search
CPC ........... G01B 9/02049; G01B 9/02018; G01B 9/02017; G01B 9/02022; G01B 9/02061; G01B 11/026; G01B 2290/30
USPC ........................................................... 356/499
See application file for complete search history.

(56) References Cited

U.S. PATENT DOCUMENTS

| 5,187,545 | A | | 2/1993 | Allgäuer | |
|---|---|---|---|---|---|
| 5,196,902 | A | * | 3/1993 | Solomon | G01J 3/453 356/455 |
| 5,654,798 | A | * | 8/1997 | Bruning | G01B 11/2441 356/512 |
| 5,793,488 | A | * | 8/1998 | Kulawiec et al. | 356/512 |
| 7,292,346 | B2 | * | 11/2007 | De Groot et al. | 356/496 |
| 7,505,144 | B2 | | 3/2009 | Mueller et al. | |
| 8,922,781 | B2 | * | 12/2014 | Tearney et al. | 356/479 |
| 2011/0235051 | A1 | | 9/2011 | Huber et al. | |

FOREIGN PATENT DOCUMENTS

| DE | 90 07 809 U1 | 1/1997 |
|---|---|---|
| DE | 10 2007 016 774 A1 | 10/2008 |
| DE | 10 2010 003 157 A1 | 9/2011 |
| GB | 2 443 662 A | 5/2008 |

OTHER PUBLICATIONS

Tamiya, Hideaki, "Non-contact Displacement Meter for Picometer Resolution," 2012 Precision Engineering Society Spring Meeting, published by Precision Engineering Society, 2012, pp. 1013-1014.
English-language translation of Tamiya, Hideaki, "Non-contact Displacement Meter for Picometer Resolution," 2012 Precision Engineering Society Spring Meeting, published by Precision Engineering Society, 8 pages.

* cited by examiner

*Primary Examiner* — Tarifur Chowdhury
*Assistant Examiner* — Jonathon Cook
(74) *Attorney, Agent, or Firm* — Brinks Gilson & Lione

(57) ABSTRACT

A device for interferential distance measurement that includes a measurement reflector having a surface and a light source emitting a beam parallel to the surface. The device includes a splitter element including a splitter grating that is disposed perpendicular to the surface, wherein the splitter grating receives the beam and splits the beam into a measurement beam and a reference beam, wherein the measurement beam acts at least twice upon the measurement reflector along a path of the measurement beam. The device including a combining element, at which the measurement beam and the reference beam enter into interferential superposition to form interfering measurement and reference beams. The device further includes a detector arrangement, by way of which a scanning signal pertaining to a distance between the measurement reflector and a component of said device in a measuring direction can be generated from the interfering measurement and reference beams.

18 Claims, 13 Drawing Sheets

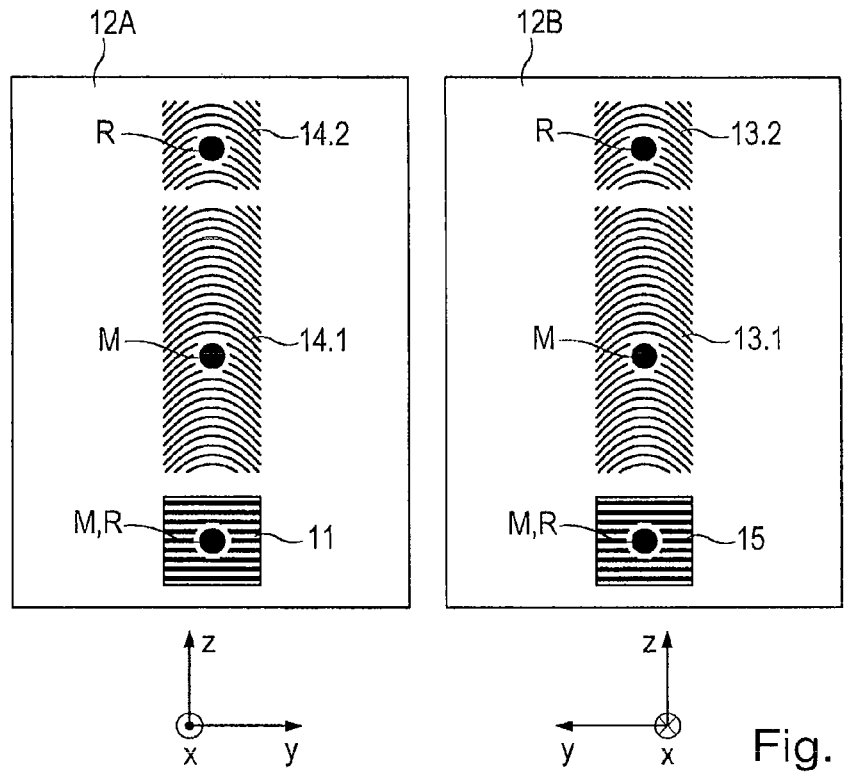
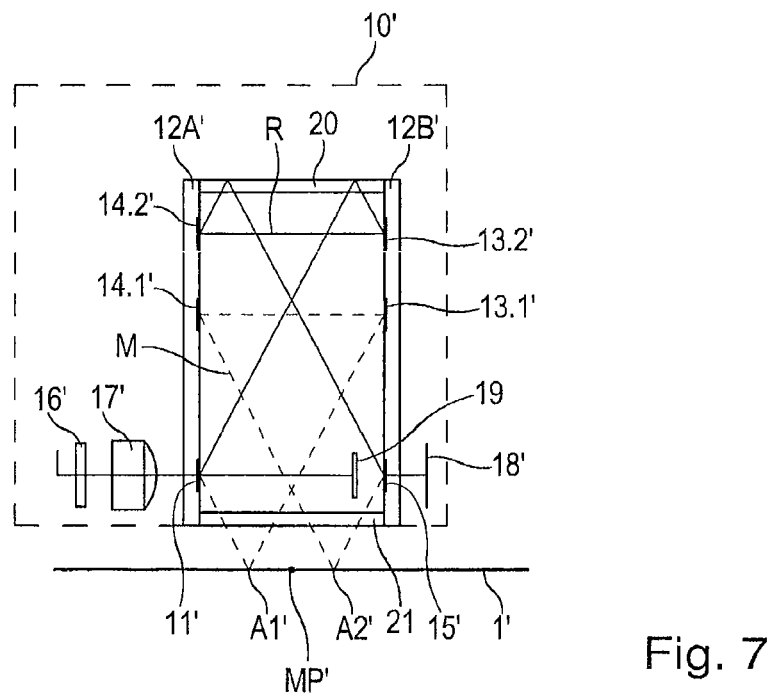

DEVICE FOR DISTANCE MEASUREMENT

RELATED APPLICATIONS

Applicants claim, under 35 U.S.C. §119, the benefit of priority of: 1) the filing date of Jun. 15, 2012 of a German patent application, copy attached, Serial Number 10 2012 210 079.2, filed on the aforementioned date, and 2) the filing date of Feb. 27, 2013 of a German patent application, copy attached, Serial Number 10 2013 203 211.0, filed on the aforementioned date, the entire contents of each of which is incorporated herein by reference.

BACKGROUND

1. Technical Field

The present invention relates to a device for interferential distance measurement.

2. Background Information

Besides the acquisition of position changes of two objects movable relative to one another in a lateral direction, there are also measurement tasks in which it is solely, or additionally, necessary to determine the distance between these objects in a vertical measuring direction, perpendicular to the lateral direction. For high-precision distance measurement in such a measuring direction, interferential methods such as those disclosed in DE 10 2007 016 774 A1 or DE 10 2010 003 157 A1 may be considered.

The device for interferential distance measurement known from DE 10 2007 016 774 A1 includes an emitter-receiver unit, which is disposed on a glass plate and placed at a distance to be determined from an object, and a mirror is disposed on the object. Splitter gratings that split the beams emitted by the light source into at least one measurement beam and at least one reference beam are disposed on the glass plate. The measurement beam is propagated in the direction of the mirror on the object and is reflected from it back in the direction of the emitter-receiver unit. The reference beam is propagated solely within the glass plate, and after multiple reflections it enters into interferential superposition with the measurement beam in the emitter-receiver unit. From the interference signals obtained in this way, the distance between these components can be ascertained. One disadvantage of this device is that in the event of tilting between the glass plate and the mirror, erroneous scanning signals result. Another disadvantage of this device is that the measurement outcome depends on the wavelength of the light source employed. The wavelength can vary because of fluctuations in ambient conditions and can thereby cause mistakes in the distance measurement.

The device known from DE 10 2010 003 157 A1 solves the aforementioned problems in DE 10 2007 016 774 A1 by appropriate beam guidance of the measurement and reference beams. At least at a predetermined set-point distance, it is ensured that the distance measurement is independent of any wavelength fluctuations and is not vulnerable to tilting.

A device for interferential distance measurement that by comparison is optimized still further is known from the publication "Non-contact displacement meter for splitter element resolution" by Hideaki Tamiya (Precision Engineering Society of Japan, Spring Meeting, March 2012). This device includes a measurement reflector, a light source, a splitter element in the form of a beam splitter cube, a combining element, and a detector arrangement. Via the splitter element, a beam emitted by the light source is split into at least one measurement beam and at least one reference beam. Further down the path of the beam, the measurement beam acts four times on the measurement reflector, before entering at the combining element into interferential superposition with the reference beam. Via the detector arrangement, at least one scanning signal is generated from the interfering measurement and reference beams, relating to the distance in the measuring direction between the measurement reflector and one or more other components of the device.

A disadvantage of that proposed device is that in the event of a deviation in the actual wavelength from an assumed nominal wavelength if the measurement reflector tilts, the result is a measurement error in the distance determination. In this regard, see FIG. 1, which shows a fragmentary view of the beam path of the device from the aforementioned publication. From top left in this view, the measurement beam M strikes the measurement reflector MR at the impact site A1 at an angle of incidence α=45°, then reaches a grating G and next strikes the measurement reflector MR again at the impact site A2. After a rereflection, not shown, at a retroreflector, the measurement beam M takes the same path a second time in the opposite direction and acts on the measurement reflector MR a total of four times before it enters into interferential superposition with the reference beam—not shown. The interference signal that thus results represents the scanning signal to be determined, in the event of changes in the distance by which the measurement reflector MR is spaced apart from the remaining components in the measuring direction z shown in FIG. 1.

In the event of tilting of the measurement reflector MR about the y axis indicated, an observation of the k vector of the measurement beam M in the course of the distance traveled furnishes a resultant phase shift $\phi_k$ in the measurement beam M, in accordance with the following equation (1):

$$\phi_k = 8 \cdot \sqrt{2} \cdot \pi \cdot R_y \cdot \Delta x \cdot (1/\lambda_0 - 1/\lambda) \qquad \text{(equation 1)}$$

in which $\phi_k$=phase shift upon tilting of the measurement reflector MR about the y axis; 4 interactions of the measurement beam with the measurement reflector; α=45°

$R_y$=angle of rotation about the y axis $\Delta x$=distance of the impact sites A1, A2 from the tilt axis in the x direction $\lambda$=actual wavelength $\lambda_0$=nominal wavelength.

As can be seen from equation (1), upon such tilting and a deviation of the actual wavelength $\lambda$ from the nominal wavelength $\lambda_0$, there is a resultant phase shift $\phi_k \neq 0$ on the part of the measurement beam M. Such a phase shift $\phi_k$ arises from the wavelength-dependent deflection at the grating G and the attendant displacement of the impact site A2 in the case where $\lambda \neq \lambda_0$. In the scanning signal generated, it causes a change in the spacing distance, even though nothing has changed with regard to the distance to be measured in the measuring direction z. In the case of the parameters $R_y$=5 mrad, $\Delta x$=5 mm, $\lambda_0$=780 nm, and $\lambda = \lambda_0 + 5$ nm, the result with equation 1 would be a phase shift $\phi_k = 1.15 \cdot 2\pi$ in the measurement beam M, which causes a considerable error in the distance determination.

Accordingly, the proposed device in the aforementioned publication is not independent, under all conditions, of possible resultant changes in wavelength. Such changes can for instance be due to changing ambient, conditions and if tilting of the measurement reflector occurs, they cause erroneous measurements of the distance to be determined.

OBJECTS AND SUMMARY OF THE INVENTION

An object of the present invention is to create a device for high-precision interferential distance measurement in which the measured distance is completely independent of the wavelength of the light source employed. In particular, if the measurement reflector should tilt, no measurement errors should result even if there is a deviation in the actual wavelength from the nominal wavelength.

This object is attained according to the invention by a device for interferential distance measurement that includes a measurement reflector having a surface and a light source emitting a beam parallel to the surface. The device includes a splitter element including a splitter grating that is disposed perpendicular to the surface, wherein the splitter grating receives the beam and splits the beam into a measurement beam and a reference beam, wherein the measurement beam acts at least twice upon the measurement reflector along a path of the measurement beam. The device including a combining element, at which the measurement beam and the reference beam enter into interferential superposition to form interfering measurement and reference beams. The device further includes a detector arrangement, by way of which a scanning signal pertaining to a distance between the measurement reflector and a component of said device in a measuring direction can be generated from the interfering measurement and reference beams.

The device according to the present invention for interferential distance measurement includes a measurement reflector, a light source, a splitter element, a combining element, and a detector arrangement. Via the splitter element, a beam emitted by the light source is split into at least one measurement beam and at least one reference beam, and further down the path of the beam, the measurement beam acts at least twice upon the measurement reflector. At the combining element, the measurement beam and the reference beam enter into interferential superposition. Via the detector arrangement, at least one scanning signal pertaining to the distance between the measurement reflector and one or more other components of the device in the measuring direction can be generated from the interfering measurement and reference beams. The splitter element is embodied here as a splitter grating. The light source emits the beam parallel to the surface of the measurement beam, in the direction of the splitter grating. The splitter grating is disposed perpendicular to the surface of the measurement reflector.

It is possible that the light source, the splitter grating, the combining element and the detector arrangement are disposed together with other components in a scanning unit, which is disposed at variable distances relative to the measurement reflector, at least in the measuring direction.

It can be provided that the splitter grating is disposed on a plate-like carrier element, and the carrier element is oriented perpendicularly to the surface of the measurement beam.

Advantageously, at least two deflection elements are each disposed in the beam path of the reference beam and of the measurement beam, between the splitter grating and the combining element. Via each deflection element, there is a resultant deflection effect on the incident beam, either in the measuring direction, or in the measuring direction and perpendicular to the measuring direction.

It can be provided that via the deflection elements:
a collimated beam striking them furthermore experiences a focusing effect on a linear focus, the linear focus extending in the measuring direction, and
there is furthermore a resultant collimating effect on a divergent beam striking them.

It is possible that the deflection elements include diffractive structures, which are disposed on carrier elements that are disposed perpendicularly to the measurement reflector.

For example, the deflection elements can be embodied as reflective cylindrical Fresnel lenses. Via the reflective cylindrical Fresnel lenses, there is not only a resultant focusing effect, but in addition a resultant deflection effect, in the measuring direction upon the incident beam.

It is also possible that via two of the deflection elements, there is a resultant focusing action on the incident beams onto a linear focus.

It is moreover possible that the deflection elements are embodied as transmissive cylindrical Fresnel lenses, which are each disposed together with a reflector on two carrier elements, and
the transmissive cylindrical Fresnel lenses are disposed on the sides toward one another of the carrier elements,
the reflectors are disposed on the respective opposite sides of the carrier elements, and their reflective side is oriented in the direction of the transmissive cylindrical Fresnel lenses, and
the transmissive cylindrical Fresnel lenses are embodied such that a collimated beam striking them experiences a linear focusing onto the reflective side of the reflectors.

Alternatively, the deflection elements can be embodied as reflective off-axis cylindrical Fresnel lenses, which are disposed on the sides toward one another of two carrier elements.

It is advantageously provided that between the splitter grating and the combining element, the reference beam is propagated solely in the scanning unit.

In one possible embodiment, it is furthermore provided that between the splitter grating and the combining element, the beam paths of the measurement and reference beams each extend mirror-symmetrically to a plane of symmetry which is oriented perpendicularly to the surface of the measurement reflector.

It is moreover possible that the deflection elements are embodied as transmissive cylindrical Fresnel lenses, which are disposed on opposite sides of a plate-like carrier element that is placed between two outer plate-like carrier elements and on which carrier elements the splitter grating and a combining element are disposed.

It can be provided here that the components in the scanning unit are disposed and embodied such that:
the measurement beam is propagated from the splitter grating in the direction of the measurement reflector and there, at a first impact site, experiences a first reflection in the direction of the first deflection element in the scanning unit; and
at the first deflection element, the measurement beam then experiences a deflection in the direction of a second deflection element; and
at the second deflection element, the measurement beam then experiences a deflection in the direction of the measurement reflector and there, at a second impact site, experiences a second reflection in the direction of the combining element; and
the reference beam is propagated from the splitter grating in the direction of the first deflection element and experiences there a deflection in the direction of the second deflection element; and
at the second deflection element, the reference beam experiences a deflection in the direction of the combining element.

In one possible embodiment, it is provided that the combining element is embodied as a combining grating and is disposed perpendicularly to the surface of the measurement reflector.

The result, as an advantage of the present invention, is complete independence of the distance measurement from any changes in wavelength. This can be ascribed to the fact that for all spacings of the measurement reflector, the optical path lengths traversed in the interfering measurement beam and reference beam are identical. Hence, any fluctuations in wavelength do not affect the distance measurement in the device of the present invention, whether in normal operation or in the event of tilting of the measurement reflector.

Moreover, because of the symmetrical beam guidance in the device of the present invention, it proves advantageous that the effective measurement point on the measurement reflector does not shift in position even if changes in spacing occur, but instead is always located centrally on the measurement reflector, between the impact sites of the measurement beam.

Finally, another advantage of the device of the present invention is that broadband light sources, such as LEDs, can be used.

Further details and advantages of the present invention will be described in further detail below in terms of exemplary embodiments of the device of the present invention in conjunction with the drawings.

BRIEF DESCRIPTION OF THE DRAWINGS

In the drawings:

FIG. 5 is a top view onto an embodiment of carrier elements of the device of FIGS. 3-4, with the deflection elements disposed on them in accordance with the present invention;

FIG. 7 is a schematic illustration of the beam path in a variant of the first embodiment of the device of FIGS. 3-4 in accordance with the present invention;

FIG. 9b is another illustration of the beam path in the elevation view of FIG. 9a;

FIG. 13b is another illustration of the beam path in the elevation view of FIG. 13a;

DETAILED DESCRIPTION OF THE PREFERRED EMBODIMENTS

Before the individual exemplary embodiments of the device of the present invention for interferential distance measurement are described in detail, some fundamental considerations about the device of the present invention will first be explained in conjunction with FIG. 2.

Figure 1:
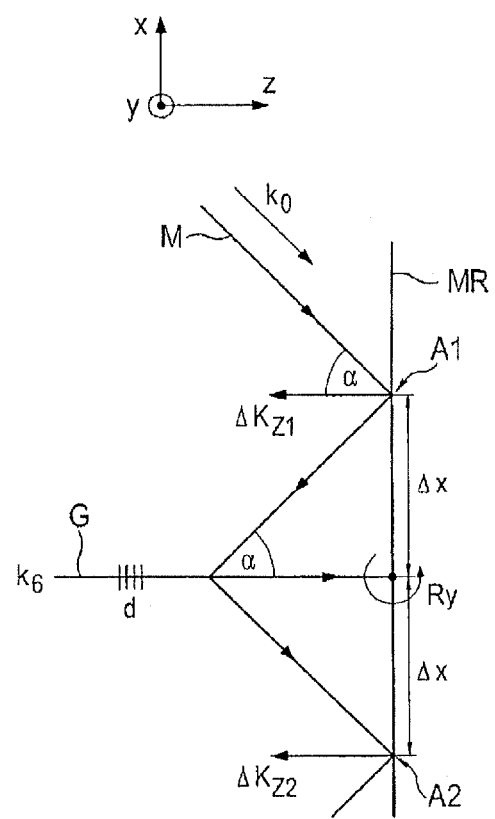
FIG. 1 is a schematic illustration for explaining a known device according to the prior art.
Figure 2:
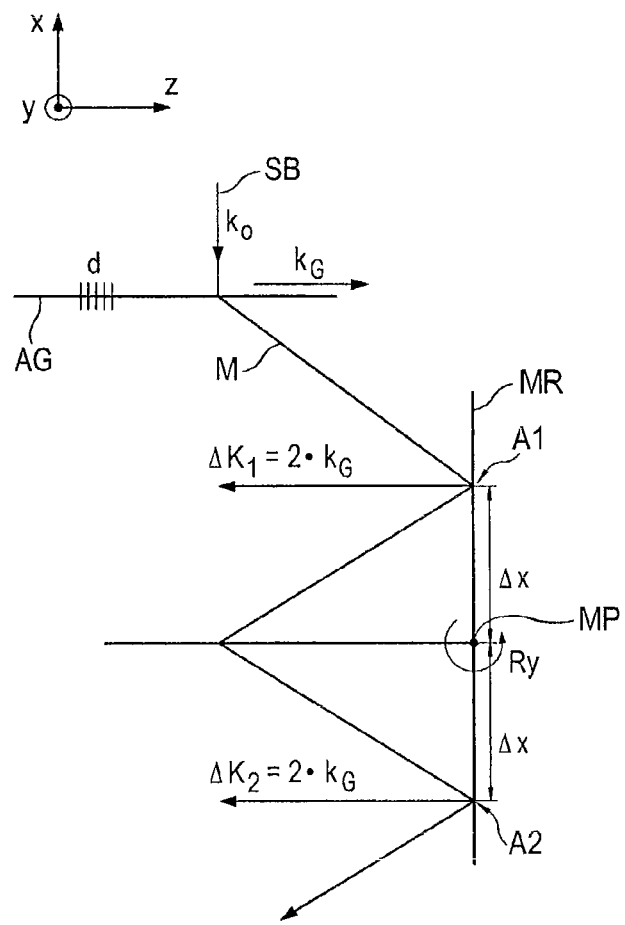
FIG. 2 is an illustration analogous to FIG. 1 in terms of which an embodiment of a device of the present invention will be described in accordance with the present invention.

FIG. 2 is a fragmentary view, analogous to FIG. 1, of the path of the measurement beam M in one possible embodiment of the device of the present invention. The beam SB striking the splitter grating AG vertically from above is split at the splitter grating AG into both a measurement beam M and a reference beam (not shown). In this variant, the measurement beam M strikes the measurement reflector MR twice at the impact sites A1, A2, is deflected back multiple times by deflection elements or gratings that are perpendicular to the measurement reflector MR, and finally enters into interferential superposition with the reference beam.

Let the k vector $k_0$ of the incident beam SB be in accordance with $$k_0 = 2\pi/\lambda \quad \text{(equation 2.1)}$$

in which
$\lambda$ = wavelength.

Let the grating vector $k_G$ of the splitter grating AG be in accordance with $$k_G = 2\pi/d \quad \text{(equation 2.2)}$$

in which
d = grating period of the splitter grating AG.

The z component $k_z$ of the k vector of the measurement beam M striking the measurement reflector MR is obtained from $$k_z = 2\pi/d \quad \text{(equation 3.1)}.$$

The change $\Delta k_z$ in the z component of the k vector of the measurement beam M after one reflection at the measurement beam MR is obtained from $$\Delta k_z = 4\pi/d \quad \text{(equation 3.2)}.$$

In the event of shifting and/or tilting of the measurement reflector MR about the y axis, the resultant phase shifts $\phi_1$, $\phi_2$ for the measurement beam M at the impact sites A1, A2 are in accordance with $$\phi_1 = \Delta k_1 \cdot \Delta z_1 = 4\pi/d \cdot (\Delta z - R_y \cdot \Delta x) \quad \text{(equation 4.1)}$$

$$\phi_2 = \Delta k_2 \cdot \Delta z_2 = 4\pi/d \cdot (\Delta z + R_y \cdot \Delta x) \quad \text{(equation 4.2)}$$

in which
$\phi_1$, $\phi_2$ = phase shifts $\phi_1$, $\phi_2$ of the measurement beam at the impact sites A1, A2

$\Delta k_1$, $\Delta k_2$ = change in the z component of the k vector of the measurement beam at the measurement reflector at the impact sites A1, A2

$\Delta z_1$, $\Delta z_2$ = shift in position of the measurement reflector in the z direction at the impact sites A1, A2

$\Delta z$ = shift in position of the measurement reflector in the z direction upon displacement along the z axis $R_y$ = angle of rotation of the measurement reflector about a tilt axis which extends parallel to the y axis through the point MP $\Delta x$ = spacing of the impact sites A1, A2 from the tilt axis of the measurement reflector along the x axis.

The total resultant phase shift $\phi$ is then obtained according to $$\phi = \phi_1 + \phi_2 = 4\pi/d \cdot 2\Delta z = 8\pi/d \cdot \Delta z \quad \text{(equation 5)}$$

In contrast to the prior art discussed previously (equation 1), the actual wavelength $\lambda$ is not involved in equation 5. The independence of the distance measurement from the wavelength $\lambda$ exists here in particular also in the event of tilting of the measurement reflector MR about the y axis; that is, if in this case $\Delta z=0$, then the result of equations 4.1, 4.2 and 5 is $\phi_k=0$, since when the phase shifts $\phi_1$ and $\phi_2$ are added up, the tilt-angle-dependent term $R_y \cdot \Delta x$ is canceled out. In contrast to this, the tilt-angle-dependent term in the prior art discussed previously is described by equation 1.

Accordingly, in the device of the present invention, any tilting of the measurement reflector MR about the y axis that might happen causes no phase shift $\phi_k$ on the part of the measurement beam M when $\Delta z=0$. The distance measurement in the device of the invention is thus independent in all cases from any change in wavelength that might occur.

What is definitively responsible for this independence in the device of the present invention is that the beam SB striking the splitter grating AG extends parallel to the measurement reflector MR, and all further beam deflections in the direction of the measurement reflector MR are likewise effected by deflection elements or gratings that are perpendicular to the measurement reflector MR. Because of this, on the one hand, if there is a change in the wavelength of the light source, the two impact sites A1, A2 are displaced in contrary fashion, i.e., symmetrically, to the measurement point MP. On the other hand, each time the measurement beam M strikes the measurement reflector MR, the z components $k_z$ of the k vectors of the measurement beam M are defined solely by the grating constants of the splitter grating and of the further gratings of the various deflection elements, and thus independently of wavelength. Consequently, the changes $\Delta k_1$, $\Delta k_2$ in equations 4.1 and 4.2, and hence the conversion of the displacements $\Delta z_1$, $\Delta z_2$ into corresponding phase shifts $\phi_1$, $\phi_2$, are each independent of wavelength, too.

Figure 3:
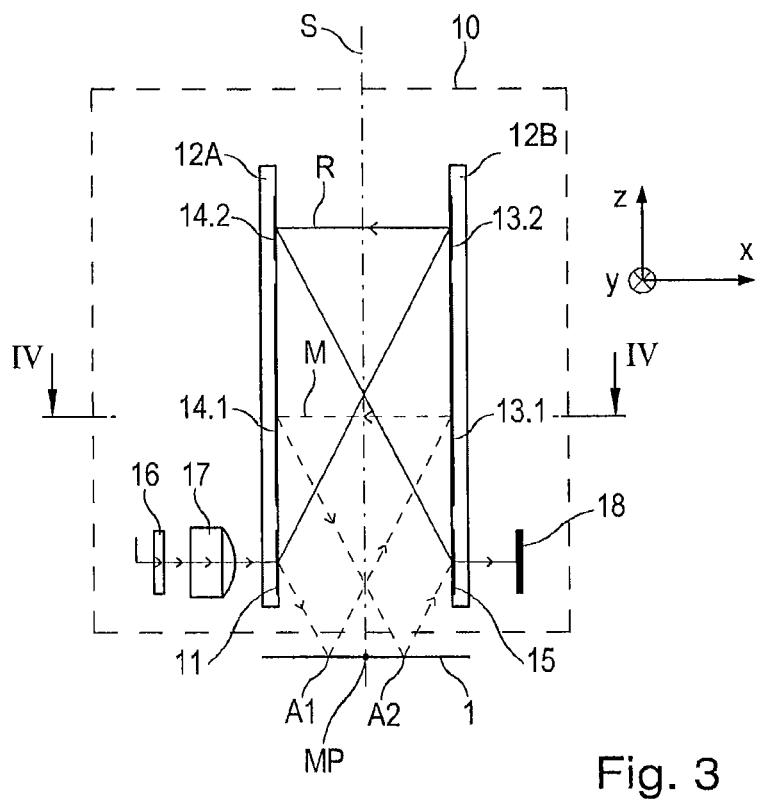
FIG. 3 is a schematic illustration of a beam path of a first embodiment of the device of the present invention in a first elevation view in accordance with the present invention.
Figure 4:
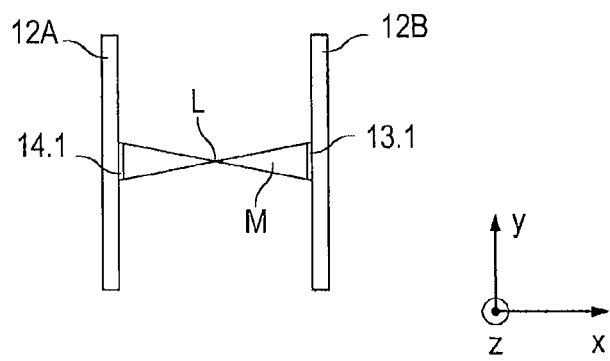
FIG. 4 is a sectional view of the beam path of the device of FIG. 3.

Below, a first exemplary embodiment of the device of the present invention for interferential distance measurement will be described in detail in conjunction with FIGS. 3, 4 and 5. FIG. 3 shows a schematic illustration of the beam path of this exemplary embodiment in a first lateral view, FIG. 4 shows part of the beam path in a second elevation view, and FIG. 5 is a top view on carrier elements of this device, with the deflection elements disposed on them.

The device of the present invention include a measurement reflector 1 and a series of further components 11-18, which in the present exemplary embodiment are disposed in a schematically shown scanning unit 10. The components 11-18 provided in the scanning unit 10 include a light source 16, a collimator lens 17, a detector arrangement 18, and two carrier elements 12A, 12B, on which further components with optical functionality are disposed; these include, for example, a splitter grating 11, deflection elements 14.1, 14.2 on the carrier element 12A, and a combining element embodied as a combining grating 15, along with further deflection elements 13.1, 13.2 on the carrier element 12B.

The measurement reflector 1 is disposed at a variable distance in the measuring direction from the scanning unit 10 or from at least some of the other components 11-18, wherein the measuring direction in each of these drawings is identified by the coordinate z. For example, the measurement reflector 1, on the one hand, and the scanning unit 10, on the other hand, may be connected to machine components (not shown) that are movable relative to one another in the measuring direction z. Via the device of the present invention for interferential distance measurement, scanning signals relating to the distance or to changes in the distance between the measurement reflector 1 and the scanning unit 10, or at least some of the components 11-18, in the measuring direction z are generated. These scanning signals can then be further processed by a downstream machine controller, also not shown.

Alternatively to the disposition of all the components 11-18 in the same scanning unit 10, it can also be provided within the scope of the present invention that the light source and/or the detector arrangement is disposed locally separately from the scanning unit and is connected via optical waveguides to the scanning unit, in which the further components are disposed, and so forth.

For generating the distance-dependent scanning signals in the measuring direction z, in the device of the present invention an interferential optical principle is employed. The scanning beam path provided for this purpose in the first exemplary embodiment will now be described detail below.

A light source 16, embodied for example as a point-like or nearly point-like semiconductor laser, emits a beam which is collimated by a collimator lens 17; as an alternative light source, an LED is also possible. The collimated beam then strikes a splitter element, which is embodied as a splitter grating 11 in the form of a transmission phase grating. As seen in FIG. 3, the splitter grating 11 is disposed perpendicular to the measurement reflector 1. In other words, the grating plane of the splitter grating is perpendicular to the surface of the measurement reflector 1. The light source 16 emits the output beam parallel to the surface of the measurement reflector 1 in the direction of the splitter grating 11. This direction is shown in the drawings as the x direction; the term "light incidence direction x" will also be used here.

At the splitter grating 11, the collimated beam arriving from the light source 16 is split into a measurement beam M and a reference beam R. To that end, the splitter grating 11 splits the incident beam into $+1^{st}$ and $-1^{st}$ orders of diffraction, with the $-1^{st}$ order of diffraction subsequently functioning as the measurement beam M, and the $+1^{st}$ order of diffraction subsequently functioning as the reference beam R. In the exemplary embodiment shown, the $0^{th}$ order of diffraction is suppressed as completely as possible.

The measurement beam M is then propagated from the splitter grating 11 in the direction of the measurement reflector 1 and there, at a first impact site A1, the measurement beam M experiences a first reflection in the direction of a first deflection element 13.1 in the scanning unit 10. The first deflection element 13.1 disposed on a carrier element 12B that is embodied as a reflective cylindrical Fresnel lens, with an additional deflection function in the measuring direction z, and it performs specific optical actions on the measurement beam M striking it.

Hence, the measurement beam M striking the first deflection element 13.1 experiences a deflection action in the measuring direction z. This means that in the x-z plane, the measurement beam M striking the first deflection element 13.1 obliquely from the bottom left is now realigned in parallel to the illuminating beam striking the splitter grating 11. The measurement beam M deflected or reflected by the first deflection element 13.1 is thus propagated parallel to the surface of the measurement reflector 1, oppositely to the light incidence direction x, in the direction of the second deflection element 14.1 on the opposite carrier element 12A.

Besides the deflection action in the measuring direction z, the first deflection element 13.1 performs still a further optical effect on the collimated measurement beam M striking it. In particular, via the first deflection element 13.1, the collimated measurement beam M also experiences a focusing effect onto a linear focus L. In other words, the collimated measurement beam M is focused linearly via the first deflection element 13.1. The resultant linear focus L—as can be seen in FIG. 4—extends in the measuring direction z and is located precisely in the middle between the two carrier elements 12A, 12B.

The two carrier elements 12A, 12B oriented perpendicular to the measurement reflector 1 are embodied in the present exemplary embodiment as glass plates. Because of the orientation of the two carrier elements 12A, 12B, all the elements disposed on the carrier elements—that is, the various deflection elements 13.1, 13.2, 14.1, 14.2 and the splitter grating 11 and the combining grating 15—are likewise disposed perpendicular to the surface of the measurement reflector 1.

As can be seen from FIG. 3, the measurement beam M is then propagated counter to the light incidence direction x to a second deflection element 14.1, which is disposed on the opposite carrier element 12A. The second deflection element 14.1 in the present exemplary embodiment is again embodied as a cylindrical Fresnel lens with an additional deflection function in the z direction, which is identical to the cylindrical Fresnel lens of the first deflection element 13.1.

Via the second deflection element 14.1, first once again a deflection action is performed in the measuring direction z in the x-z plane on the measurement beam M striking that deflection element. The measurement beam striking the second deflection element 14.2 from the right is deflected by the second deflection element 14.2 toward the bottom right, in the direction of the measurement reflector 1 from which the beam strikes the measurement reflector 1 again, at a second impact site A2. The first and second impact sites A1, A2 of the measurement beam M on the measurement reflector 1 are spaced apart from one another in the light incidence direction x.

Besides this kind of deflection action, still another optical action is performed via the second deflection element 14.2 on the measurement beam M striking that deflection element. As seen in FIG. 4, from the linear focus L, a divergent measurement beam M is propagated in the direction of the second deflection element 14.1. The second deflection element 14.1 performs a collimating action on the incident divergent measurement beam M as well. In other words, a collimated measurement beam M is again propagated in the direction of the second impact site A2 on the measurement reflector 1.

At the second impact site A2 on the measurement reflector 1, the measurement beam M undergoes a second reflection and finally is propagated in the direction of the combining grating 15 in the scanning unit 10.

At the splitter grating 11, the resultant reference beam R of the $+1^{st}$ order of diffraction is initially propagated in the direction of a third deflection element 13.2, which is disposed above the first deflection element 13.1 on the carrier element 12B in the measuring direction z. The third deflection element 13.2 is likewise embodied as a cylindrical Fresnel lens with an additional deflection function in the z direction, which is once again identical to the cylindrical Fresnel lenses of the first and second deflection elements 13.1, 14.1. The third deflection element 13.2, because of it being identical to the embodiment to the first deflection element 13.1 and the identical angle of incidence of the reference beam R onto the third deflection element 13.2 and of the measurement beam M onto the first deflection element 13.1, performs identical optical actions on the incident reference beam R to those performed by the first deflection element 13.1 on the incident measurement beam M. Accordingly, besides the deflection effect in the measuring direction z, the aforementioned focusing effect onto a linear focus in the middle between the carrier elements 12A, 12B occurs on the reference beam R as well.

From the third deflection element 13.2, the thus-affected reference beam R is then propagated to a fourth deflection element 14.2, which is disposed on the carrier element 12A above the second deflection element 14.1 in the measuring direction z. As in the case of the other three deflection elements 13.1, 13.2, 14.1, a reflective cylindrical Fresnel lens with an additional deflection function in the z direction functions as the fourth deflection element 14.2, which is embodied identically to the three deflection elements 13.1, 13.2, 14.1. At the fourth deflection element 14.2, the reference beam R striking it counter to the light incidence direction x accordingly experiences a deflection toward the bottom right in the direction of the combining grating 15. Moreover, the reference beam R divergently striking the fourth deflection element 14.2 is collimated by that deflection element. In other words, the collimated reference beam R is propagated in the direction of the combining grating 15.

As can be seen from the description of the beam path of the reference beam R and the associated drawings, in the embodiment of FIGS. 2-4, the reference beam R between the splitter grating 11 and the combining grating 15 is propagated solely in the scanning unit 10.

Because of the identical embodiment of the deflection elements 13.1, 13.2, 14.1, 14.2 and their disposition provided in the scanning unit 10, the reference beam R and measurement beam M strike the combining grating 15 at oppositely symmetrical angles of incidence and there enter into the interferential superposition.

Via the detector arrangement 18 located downstream of the combining grating 15, in the event of a change in spacing between the measurement reflector 1 and the scanning unit 10 in the measuring direction z, a periodic scanning signal can be detected that is available for further processing. In order to have information available about the direction of a change of spacing, it is advantageous to generate a plurality of phase-shifted scanning signals. For instance, three scanning signals phase-shifted by 120° each, or four scanning signals phase-shifted by 90° each, can be generated. For generating phase-shifted scanning signals, various known possibilities are fundamentally available, each of which can come to be used in the device of the present invention.

For instance, three scanning signals phase-shifted by 120° can be generated by suitably selecting the ridge-to-space ratio and the etching depth or the phase deviation of the combining grating 15.

Generating four scanning signals phase-shifted by 90° can be done by generating a vernier stripe pattern in the detection plane and by disposing a so-called structured detector in the detector arrangement 18. In that case, the graduation period of the combining element 15 should be chosen as deviating slightly from the graduation period of the splitter grating 11.

Finally, generating four scanning signals phase-shifted by 90° can also be done by polarization optics. To that end, suitable polarization-optical components should be disposed in the beam paths of the measurement beam M and the reference beam R.

For the three indicated possibilities for generating a plurality of phase-shifted scanning signals in the device of the present invention, German patent disclosure DE 10 2010 003 157 A1 is expressly incorporated by reference here. The provisions described in it can be used for generating phase-shifted scanning signals in the present invention as well.

Because of the described scanning beam path of the device of the present invention, the complete independences of the distance measurement from the light source wavelength is ensured, since the optical path lengths traversed by the measurement beam M and the reference beam R are the same for all the spacings of the measurement reflector 1 from the scanning unit 10. Any changes in wavelength that might occur have no influence in the position values generated from the resultant scanning signals, and this is particularly true in the event that tilting of the measurement reflector 1 should occur.

Because of the mirror symmetry of the scanning beam path in the x-z plane to a central plane of symmetry S between the two carrier elements 12A, 12B, the effective measurement point MP on the measurement reflector 1 moreover is not shifted in the event of changes in spacing in the measuring direction z. Like the carrier elements 12A, 12B, the plane of symmetry S is oriented vertically to the measurement reflector 1, as shown in FIG. 1. As can also be seen from FIG. 3, the effective measurement point MP is located in the light incidence direction x centrally between the two impact sites A1, A2 of the measurement beam M on the measurement reflector 1.

In one possible embodiment of the embodiment of the device of the present invention shown in FIGS. 2-4, a light source 16 is employed which emits radiation at a wavelength λ=850 nm. In addition, the graduation periods of the splitter grating 11 and combining grating 15 are each 960 nm. The effective deflection of the deflection elements 13.1, 13.2, 14.1, 14.2 in the z direction, i.e. of the focusing elements with a deflection function, is equivalent, at every point, to a grating having a graduation period of 960 nm. The spacing between the two carrier elements 12A, 12B in the x direction is chosen to be 12 mm. The result for the periodic scanning signals in the event of a change in spacing between the measurement reflector 1 and the scanning unit 10 is a signal period of the scanning signals of 240 nm.

Both in the present first embodiment of FIGS. 2-5 and in the ensuing embodiments of the device according to the present invention, it is provided in each case that the deflection elements include diffractive structures or grating graduations which are each disposed perpendicular to the measurement reflector 1. In detail, the diffractive structures provided in the various variants differ, as will be described in further detail below.

In conjunction with FIG. 6, it will now be explained how in the first embodiment of the device of the present invention, the orientation of the measurement beam M relative to the reference beam R changes in the event of tilting of the measurement reflector MR about the y axis. What is shown schematically here is the beam path of the measurement beam and reference beam upon tilting of the measurement reflector MR about the tilt angle α.

Figure 6:
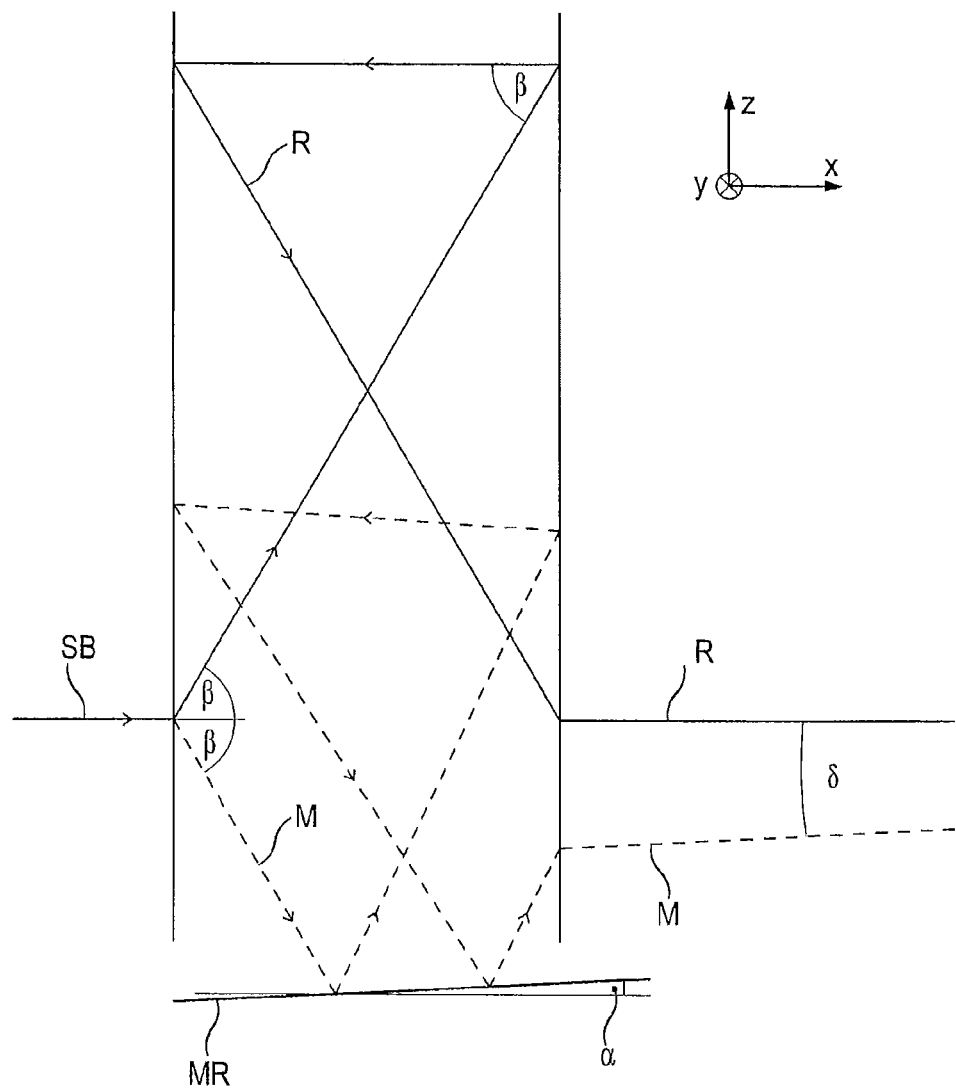
FIG. 6 is a schematic illustration of the beam path of the device of FIGS. 3-4 in the event of tilting of the measurement reflector in accordance with the present invention.

In FIG. 6, β, α, and δ stand for the following variables:
β=angle of diffraction of the deflection elements, or of the diffractive structures used for that purpose;
α=tilt angle of the measurement reflector upon tilting about the y axis;
δ=angle between the measurement beam M and the reference beam R downstream of the combining grating.

For the angle δ, the following equation is obtained:

$$\delta = 2 \cdot N \cdot \sin\beta \cdot \alpha^2 \qquad \text{(equation 6)}$$

in which
α, β, and δ are as defined above, and
N=the number of interactions of the measurement beam with the measurement reflector (in the first embodiment of FIGS. 2-6, N=2; in the second and third embodiments of FIGS. 8-15, N=4).

According to equation 6, the difference in beam direction between the measurement beam M and the reference beam R is dependent on tilting of the measurement reflector MR about the y-axis only at relatively high orders of diffraction. This means that in the present embodiment of the device of the present invention of FIGS. 2-6, such tilting of the measurement reflector MR about the y-axis has an only slight effect on the degree of modulation and the amplitude of the scanning signals generated. Possible tilting of the measurement reflector MR about the y-axis therefore need not be compensated for by imaging optical elements in the beam path of the measurement beam M. In the present exemplary embodiment, such compensation is necessary only with regard to possible tilting of the measurement reflector about the x-axis.

A slightly modified variant of the first embodiment of the device of the present invention for interferential distance measurement is shown schematically in FIG. 7. Below, only the definitive differences from the first exemplary embodiment will be addressed.

Now, for instance, on the one hand, a screen 19 is disposed in the scanning unit 10' in the connecting line between the light source 16' and the detector arrangement 18'. The screen 19 prevents a $0^{th}$ order of diffraction at the splitter grating 11' in the direction of the combining element 15' and thus prevents worsening of the degrees of modulation of the scanning signals that would otherwise ensue because of the resultant constant-light component.

Also, on the underside of the scanning unit 10', which faces toward the measurement reflector 1', a glass cover 21 is provided, and on the opposite side of the scanning unit 10', a back-face reflector 20 is provided. As in the first embodiment, the reference beam R that is propagated solely in the scanning unit 10', is initially, after being split at the splitter grating 11', reflected a first time at the back-face reflector 20 before striking the third deflection element 13.2. In addition, another deflection of the reference beam R takes place at the back-face reflector 20 between the fourth deflection element 14.2' and the combining element 15'.

An advantage of the embodiment of the device of the present invention shown in FIG. 7 is that only tilting about the x-axis by imaging elements requires compensation. The degrees of modulation and the signal amplitudes of the scanning signals are then only weakly dependent on possible tilting Rx, Ry of the measurement reflector 1'.

Figure 8:
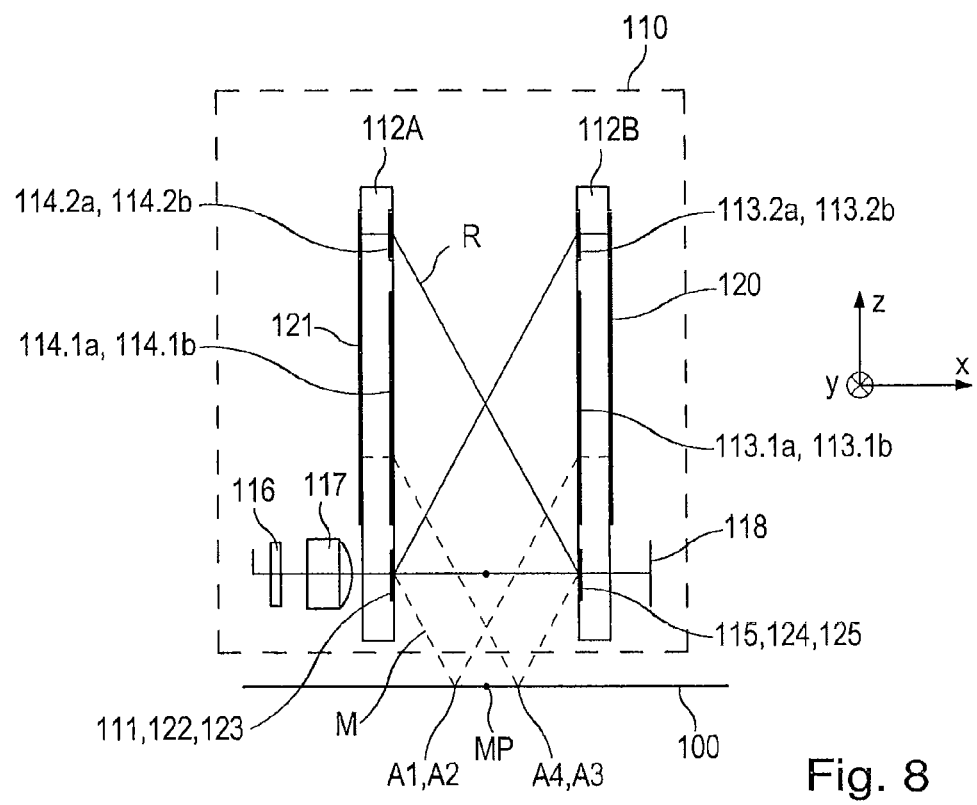
FIG. 8 is a schematic illustration of the beam path of a second embodiment of the device of the present invention in a first elevation view in accordance with the present invention.
Figure 9A:
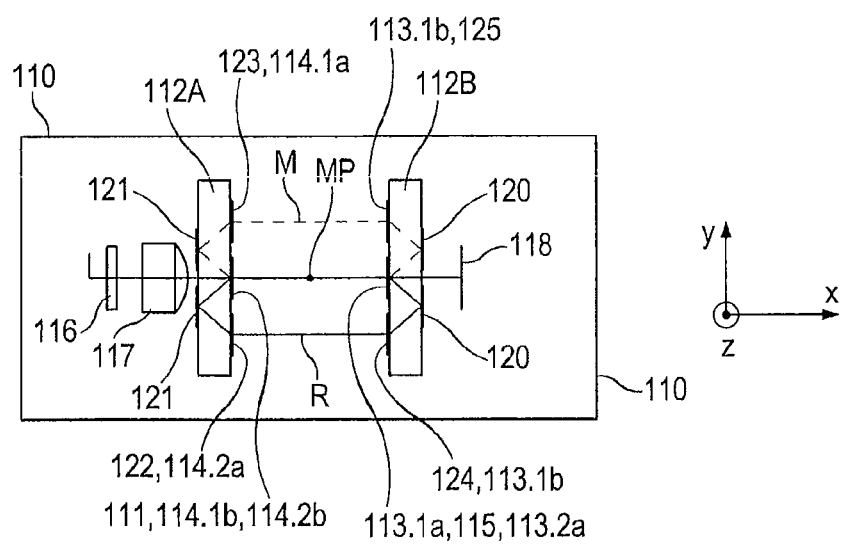
FIG. 9a is a schematic illustration of the beam path of the device of FIG. 8 in a second elevation view.
Figure 9B:
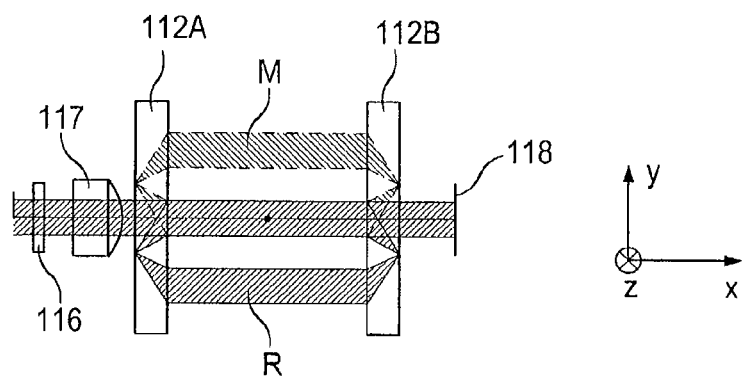
Figure 10:
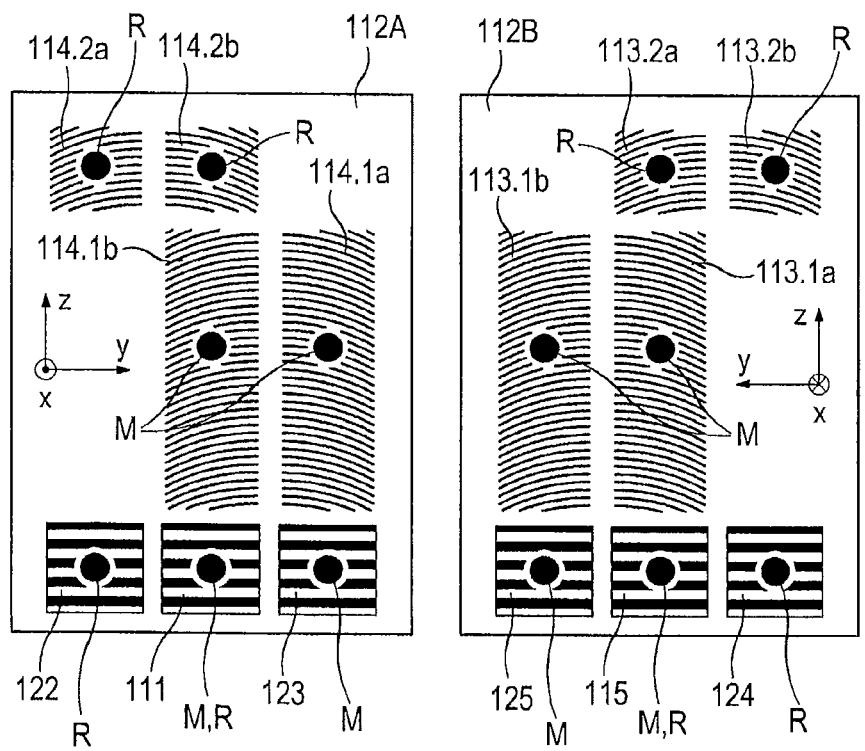
FIG. 10 is a top view onto an embodiment of carrier elements of the device of FIGS. 8 and 9a-b, with the various deflection elements disposed there.
Figure 11:
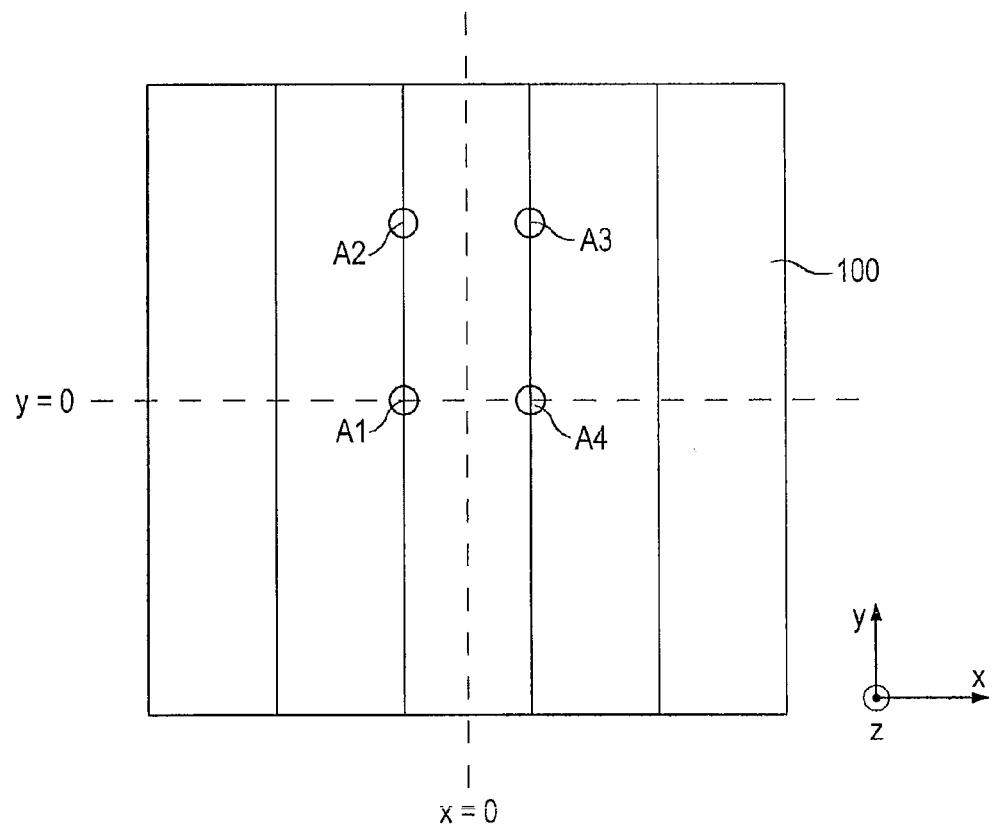
FIG. 11 is a top view onto an embodiment of a measurement reflector of the device of FIG. 10, with the various impact sites of the measurement beam.
Figure 12:
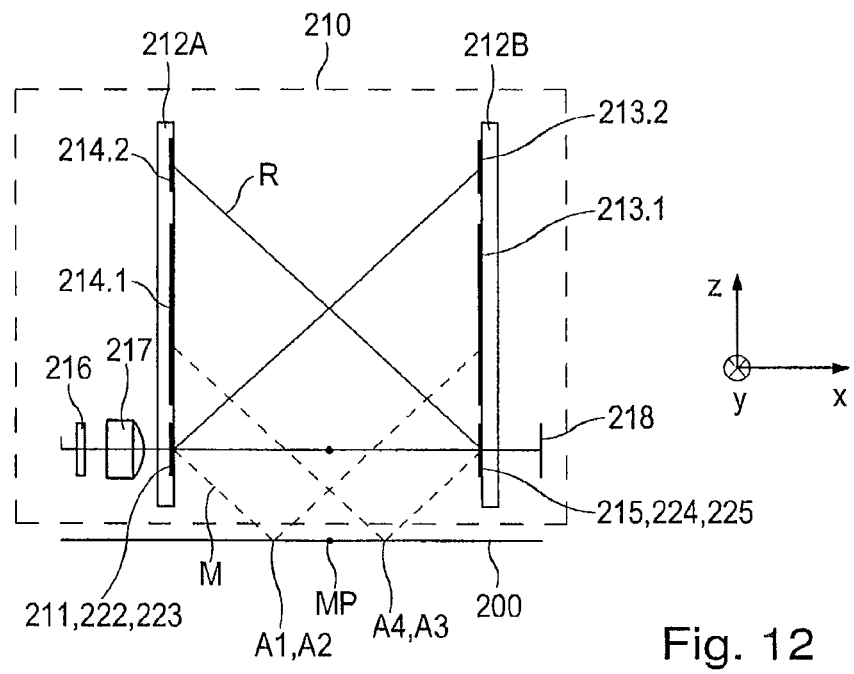
FIG. 12 is a schematic illustration of a beam path of a third embodiment of a device in a first elevation view in accordance with the present invention.

A second embodiment of the device of the present invention for interferential distance measurement is shown in FIGS. 8, 9a, 9b, 10 and 11. FIGS. 8, 9a and 9b each schematically show the beam path of this embodiment, in various elevation views. FIG. 10 shows a top view on the carrier elements, with the transmissive cylindrical Fresnel lenses disposed on them and with the measurement beam M and reference beam R striking them, and FIG. 11 is a top view on the measurement reflector, with the various impact sites of the measurement beam.

Once again, below only the definitive differences from the first embodiment of FIGS. 2-6 will be described.

Instead of a detailed description of the beam path of the measurement beam M and the reference beam R, what is indicated below is the order in which the various elements of the device of the present invention are acted upon by the measurement beam M and the reference beam R between the splitter grating 111 and the combining element 115 in the second exemplary embodiment. In this connection, see also FIGS. 8, 9*a*, 9*b*, 10 and 11.

Beam Path of Measurement Beam M:

Note that as presented below in the next two paragraphs and other paragraphs thereafter, the term "x→y" means a beam at item x is directed to item y. Thus, the beam path of the measurement beam M of FIG. 8 is denoted by: splitter grating 111→measurement reflector 100, impact site A1→deflection element 113.1*a*→reflector 120→deflection element 113.1*b*→measurement reflector 100, impact site A2→deflection element 123→deflection element 125→measurement reflector 100, impact site A3→deflection element 114.1*a*→reflector 121→deflection element 114.1*b*→measurement reflector 100, impact site A4→combining grating 115.

Beam Path of Reference Beam R:

The beam path of the reference beam R is denoted by: Splitter grating 111→deflection element 113.2*a*→reflector 120→deflection element 113.2*b*→deflection element 122→deflection element 124→deflection element 114.2*a*→reflector 121→deflection element 114.2*b*→combining grating 115.

As can be seen from this characterization of the beam path and the associated drawings, it is the deflection elements employed in the second embodiment of FIGS. 8-11, which differ in the beam paths of the measurement beam M and reference beam R from those of the first embodiment of FIGS. 2-6.

As the deflection elements 113.1*a*, 113.1*b*, 113.2*a*, 113.2*b*, 114.1*a*, 114.1*b*, 114.2*a*, 114.2*b*, on the one hand, transmissive cylindrical Fresnel lenses are used, which are each disposed together with a respective reflector 120, 121 on the carrier elements 112A, 112B. These deflection elements 113.1*a*, 113.1*b*, 113.2*a*, 113.2*b*, 114.1*a*, 114.1*b*, 114.2*a*, 114.2*b*, embodied as transmissive cylindrical Fresnel lenses, are disposed on the sides facing one another of the carrier elements 112A, 112B, and the reflectors 120, 121 are disposed on the respective opposite sides of the carrier elements 112A, 112B. The reflective side of each of the reflectors 120, 121 is oriented in the direction of the deflection elements 113.1*a*, 113.1*b*, 113.2*a*, 113.2*b*, 114.1*a*, 114.1*b*, 114.2*a*, 114.2*b* embodied as transmissive cylindrical Fresnel lenses.

Via these deflection elements 113.1*a*, 113.1*b*, 113.2*a*, 113.2*b*, 114.1*a*, 114.1*b*, 114.2*a*, 114.2*b* of the second embodiment of FIGS. 8-11, on the one hand, once again defined deflection actions are performed on the beams (measurement beam M and reference beam R) striking these deflection elements. In a difference from the above embodiment of FIGS. 3-6, however, what results via the deflection elements 113.1*a*, 113.1*b*, 113.2*a*, 113.2*b*, 114.1*a*, 114.1*b*, 114.2*a*, 114.2*b* is a deflection action on the incident beams both in the y direction and in the measuring direction z. That is, there are deflection actions both in the measuring direction z and perpendicular to the measuring direction z.

Analogously to this, the deflection elements 113.2*a*, 113.2*b*, 114.2*a*, 114.2*b* in the beam path of the reference beam R have corresponding deflection effects in the z direction and the y direction.

The result, besides the optical deflection effect, via the deflection elements 113.1*a*, 113.1*b*, 113.2*a*, 113.2*b*, 114.1*a*, 114.1*b*, 114.2*a*, 114.2*b* of the second embodiment of FIGS. 8-11 as described previously, is a focusing effect or collimating effect on the incident beams. For instance, beams striking the deflection elements 113.1*a*, 113.2*a*, 114.1*a*, 114.1*b* in collimated fashion strike the respective associated reflector 120, 121 in linearly focused fashion; the linear focus here again extends in the measuring direction z. Beams striking the deflection elements 113.1*b*, 113.2*b*, 114.1*b*, 114.2*b* in divergent fashion are collimated via these deflection elements.

In addition, in comparison to the first embodiment of FIGS. 2-6, still further deflection elements 122, 123, 124, 125 are disposed on the carrier elements 112A, 112B, respectively, these deflection elements being embodied as reflection gratings, and they are acted upon by both the measurement beam M and the reference beam R as indicated. In the present exemplary embodiment the deflection elements 122, 123; 124, 125 effect a deflection of the incident beams (the measurement beam M and the reference beam R) only in the x-z plane, or, in other words, in the measuring direction z; these deflection elements 122-125 do not perform any focusing or collimating effect on the beams striking them.

Overall, between the splitter grating 111 and the combining grating 115, because of the beam path provided in this exemplary embodiment, the measurement beam M thus strikes the measurement reflector 100 four times, at the impact sites A1-A4, and, thus, strikes the four deflection elements 113.1*a*, 113.1*b*, 114.1*a*, 114.1*b* four times as well. As a consequence, in comparison to the first embodiment of FIGS. 2-6, the resultant signal period of the scanning signals is halved; that is, because of the beam path selected, a higher measurement resolution is available.

Figure 13A:
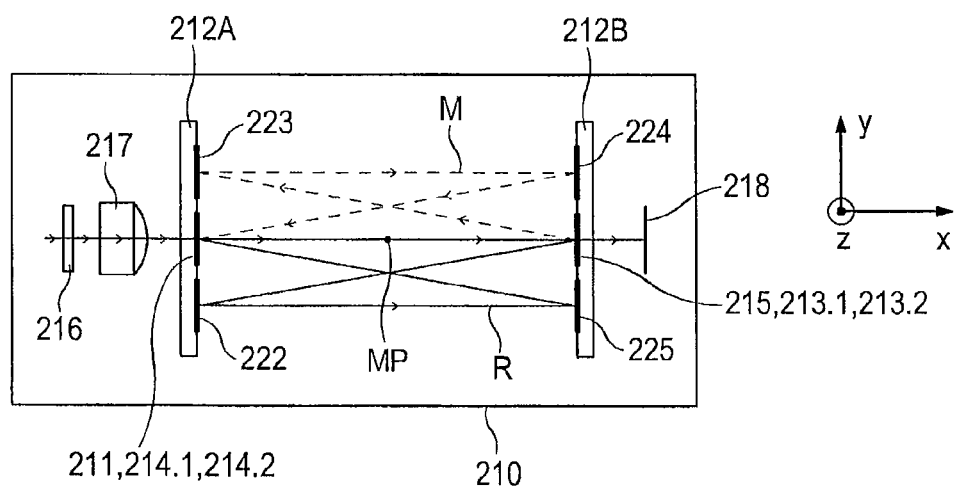
FIG. 13a is a schematic illustration of the beam path of the device of FIG. 12 in a second elevation view.
Figure 13B:
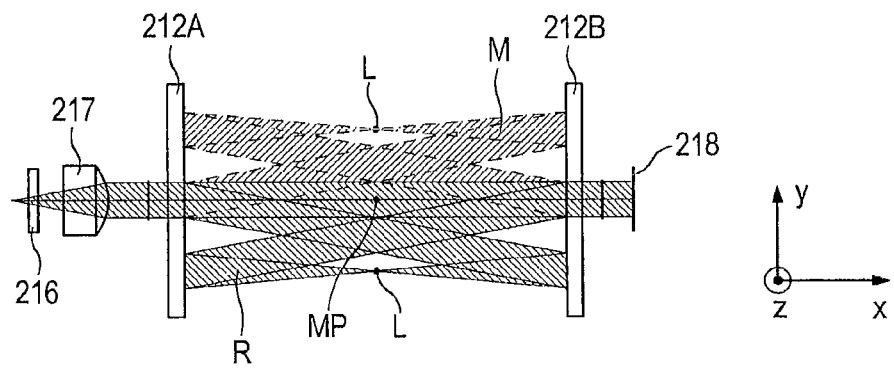
Figure 14:
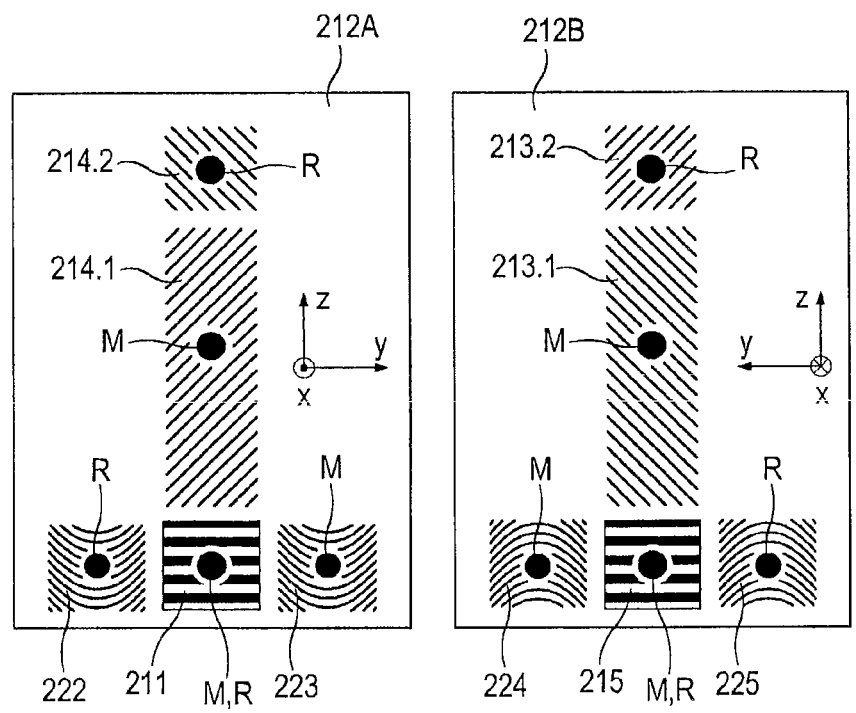
FIG. 14 is a top view onto an embodiment of a carrier elements of the device of FIG. 12, with the various deflection elements disposed there in accordance with the present invention.
Figure 15:
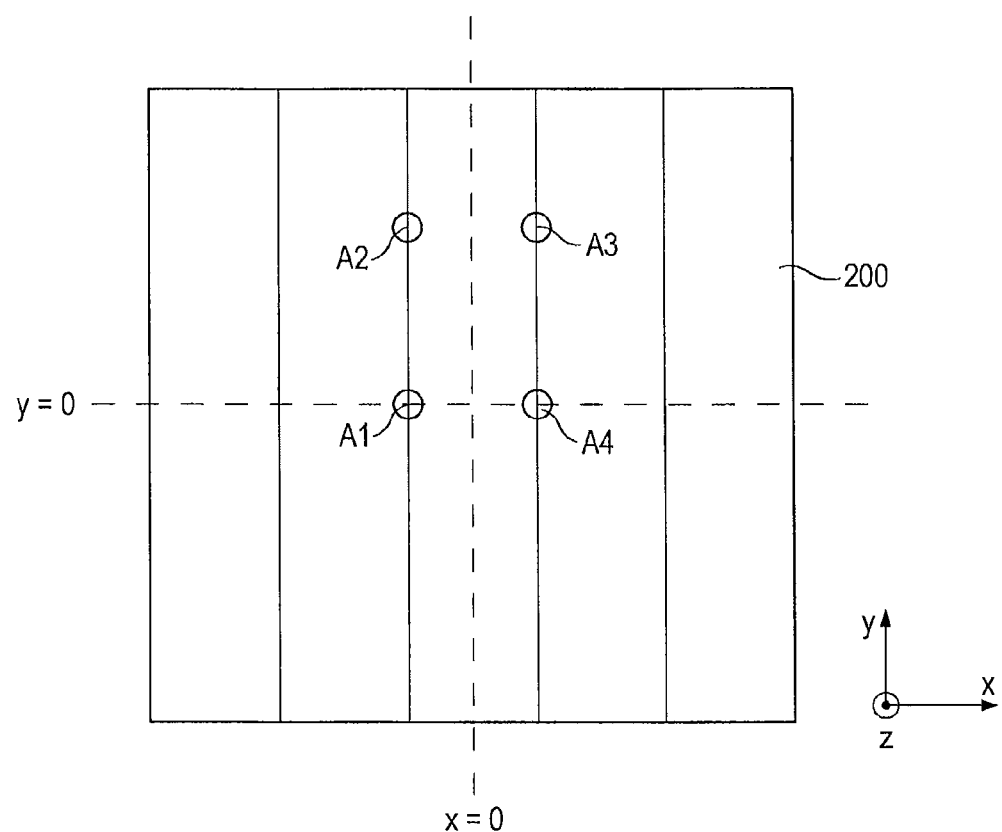
FIG. 15 is a top view onto an embodiment of a measurement reflector of the device of FIG. 12, with the various impact sites of the measurement beam in accordance with the present invention.

A third embodiment of the device of the present invention for interferential distance measurement will now be described in conjunction with FIGS. 12, 13*a*, 13*b*, 14 and 15. Analogously to the foregoing embodiment of FIGS. 8-11, FIGS. 12, 13*a* and 13*b* schematically show the beam path of this exemplary embodiment in various views. For example, FIG. 14 shows a top view on the carrier elements with the deflection elements disposed on them and with the measurement beam M and reference beam R striking them. FIG. 15 is a top view on the measurement reflector, with the impact sites of the measurement beam on the measurement reflector.

As in the foregoing embodiment of FIGS. 8-11, in this third embodiment, for the beam path of the measurement beam M and the reference beam R the order in which the various elements of the device of the invention are acted upon by the measurement beam M and the reference beam R between the splitter grating 211 and the combining element 215 is indicated. In addition, in this connection see FIGS. 12, 13*a*, 13*b*, 14 and 15.

Beam Path of Measurement Beam M:

The beam path of the measurement beam M of FIGS. 12-15 is denoted by: Splitter grating 211→measurement reflector 200, impact site A1→deflection element 213.1→measurement reflector 200, impact site A2→deflection element 223→deflection element 224→measurement reflector 200, impact site A3→deflection element 214.1→measurement reflector 200, impact site A4→combining grating 215.

Beam Path of Reference Beam R:

The beam path of the reference beam R is denoted by: Splitter grating 211→deflection element 213.2→deflection element 222→deflection element 225→deflection element 214.2→combining grating 215.

The third embodiment of FIGS. 12-15 differs from the two foregoing embodiments of FIGS. 2-6 and 8-11 essentially in the deflection elements 213.1, 213.2, 214.1, 214.2, 222, 223, 224, 225 that are provided.

The deflection elements 213.1, 213.2, 214.1, 214.2 are embodied in the third embodiment of FIGS. 12-15 as linear reflection phase gratings with obliquely positioned graduation markings. Via these deflection elements 213.1, 213.2, 214.1, 214.2, the beams (measurement beam M, reference beam R) striking them experience a deflection effect perpendicular to the measuring direction z in the x-y plane, as well as a deflection effect in the measuring direction z in the x-z plane, as can be seen for instance in the views in FIGS. 12 and 13a. For example, the measurement beam M, which coming from the impact site A1 strikes the deflection element 213.1, is deflected obliquely downward in the direction of the impact site A2 on the measurement reflector 200. There is no resultant focusing or collimation of the incident beams via the deflection elements 213.1, 213.2, 214.1, 214.2.

In the third embodiment of FIGS. 12-15, the deflection elements 222, 223, 224, 225 that are further provided are embodied as reflective off-axis cylindrical Fresnel lenses. By way of them, the beams striking them experience a deflection in the measuring direction z and in the y direction. Via the deflection element 222, for instance, the reference beam R striking it from the direction of the deflection element 213.2 is deflected in the direction of the opposite deflection element 225.

Also, via the deflection elements 222, 223, 224, 225, a focusing or collimating effect results when a collimated or divergent beam strikes them. For instance, the reference beam R that in collimated form strikes the deflection element 222 is focused linearly into the center between the carrier elements 212A, 212B. The linear focus L again extends in the measuring direction z, as can be seen in FIG. 13b. The divergent reference beam R subsequently striking the deflection element 225 is collimated by that deflection element and deflected in the y direction and in the z direction toward the deflection element 214.2.

As in the second embodiment of FIGS. 8-11, because of the beam path provided between the splitter grating 211 and the combining element 215, the measurement beam M again strikes the measurement reflector 200 four times. In comparison to the first embodiment of FIGS. 2-6, the result is therefore once again a halved signal period for the scanning signals.

A fourth embodiment of the device of the present invention for interferential distance measurement will now be explained in conjunction with FIGS. 16, 17 and 18. Once again, FIGS. 16 and 17 each schematically show the beam path of this embodiment in various views, and FIG. 18 shows various top views onto a plurality of elements of this embodiment.

One difference from the previously described embodiments of FIGS. 2-6 and 8-15 that should be mentioned is a third plate-like carrier element 330, disposed centrally in the scanning unit 310, on which the two deflection elements 330.1, 330.2 are now disposed. In contrast to the previous embodiments, the deflection elements 330.1, 330.2 are embodied as diffractive structures in the form of transmission gratings, which perform specific optical actions on the beams striking them. As the third carrier element 330, preferably a transparent glass plate is provided, the first deflection element 330.1 is disposed on the side facing toward the first carrier element 312A, and the second deflection element 330.2 is disposed on the side facing toward the second carrier element 312B.

The scanning unit 310 is closed off, toward the measurement reflector 300, by a transparent glass plate 340, and a further glass plate 342 is disposed on the opposite side of the scanning unit 310. As FIG. 16 shows, compensation elements 341.1, 341.2 are also disposed between the middle, third carrier element 330 and the two outer carrier elements 312A, 312B and are likewise embodied as glass plates of specific thicknesses, and they each extend between the middle carrier element 330 and the adjacent carrier elements 312A, 312B. For the function of the compensation elements, see the following description of the scanning beam path of this embodiment.

The beam emitted by the light source 316 is collimated by a collimator lens 317, analogously to the other embodiments of FIGS. 2-6 and 8-15, and then strikes the splitter element, which is again embodied as a splitter grating 311 in the form of a transmission phase grating and as in the other embodiments of FIGS. 2-6 and 8-15 is disposed on a first carrier element 312A.

Via the splitter grating 311, the splitting of the incident collimated beam from the light source 316 into a measurement beam M and a reference beam R is effected, for which purpose once again splitting is done into $+1^{st}$ and $-1^{st}$ orders of diffraction. After that, the $-1^{st}$ order of diffraction functions as the measurement beam M, and the $+1^{st}$ order of diffraction functions as the reference beam R. In the embodiment shown, the $0^{th}$ order of diffraction is suppressed as completely as possible by the splitter grating 311. To ensure that any $0^{th}$ order of diffraction that might still be present does not unnecessarily worsen the interference contrast and hence the signal quality of the scanning signals, a screen 350 is placed adjacent to the splitter grating 311 in the scanning unit 310.

The measurement beam M is then propagated from the splitter grating 311 in the direction of the measurement reflector 300, where at the first impact site A1 it experiences a first reflection in the direction of the first deflection element 330.1 in the scanning unit 310. The first deflection element 330.1, disposed on the middle carrier element 330, is as indicated above embodied as a transmissive cylindrical Fresnel lens and performs specific optical actions on the measurement beam M striking it.

Thus, the measurement beam M striking the first deflection element 330.1 experiences a deflection action in the measuring direction z. This means that in the x-z plane, the measurement beam M striking the first deflection element 330.1 obliquely from bottom left is again aligned parallel to the illumination beam striking the splitter grating 311. The measurement beam M deflected or transmitted by the first deflection element 330.1 is thus propagated parallel to the surface of the measurement reflector 300 in the light incidence direction x in the direction of the second deflection element 330.2 on the opposite side of the middle carrier element 330.

In this embodiment as well, besides the deflection action in the measuring direction z, the first deflection element 330.1 also performs a further optical action on the collimated measurement beam M striking it. Via the first deflection element 330.1, the collimated measurement beam M furthermore experiences a focusing action onto a linear focus L. In other words, the collimated measurement beam M is focused linearly via the first deflection element 330.1. The resultant linear focus L—as FIG. 17 shows—extends in the measuring direction z and is located precisely in the middle between the two outer carrier elements 312A, 312B.

Figure 16:
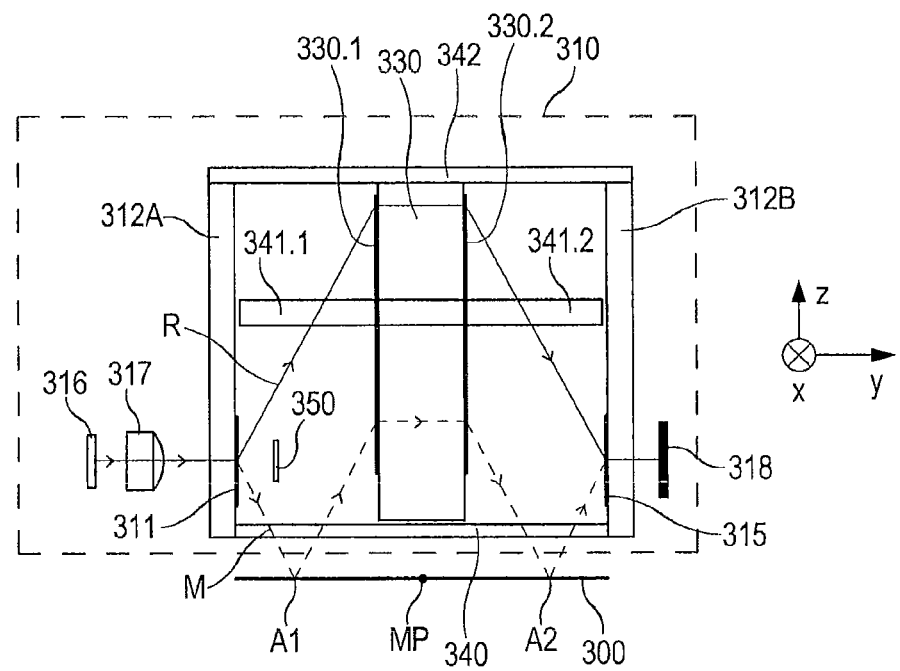
FIG. 16 is a schematic illustration of a beam path of a fourth embodiment of a device in a first elevation view in accordance with the present invention.

As seen in FIG. 16, the measurement beam M is then propagated parallel to the light incidence direction x to a second deflection element 330.2, which is disposed on the opposite side of the carrier element 330. In the present embodiment of FIGS. 16-18, the second deflection element 330.2 is likewise embodied as a transmissive cylindrical Fresnel lens with an additional deflection function in the z direction, which is identical to the cylindrical Fresnel lens of the first deflection element 330.1.

Via the second deflection element 330.2, a deflection action in the measuring direction z in the x-z plane is once again performed on the measurement beam M striking that deflection element. The measurement beam M striking the second deflection element 330.2 from the left is deflected by the second deflection element 330.2 toward the bottom right, in the direction of the measurement reflector 300. At a second impact site A2 of the measurement reflector 300, the measurement beam strikes the measurement reflector 300 a second time. The first and second impact sites A1, A2 of the measurement beam M on the measurement reflector 300 are spaced apart from one another in the light incidence direction x.

Besides this kind of deflection action, a further optical effect on the measurement beam M striking the section deflection element 330.2 again results, via that deflection element. As seen in FIG. 17, from the linear focus L onward, a divergent measurement beam M is propagated in the direction of the second deflection element 330.2. Besides the previously mentioned deflection action, the second deflection element 330.2 performs a collimating effect on the divergent measurement beam M striking it. In other words, a collimated measurement beam M is again propagated in the direction of the second impact site A2 on the measurement reflector 300.

At the second impact site A2 on the measurement reflector 300, the measurement beam M experiences a second reflection and finally is propagated in the direction of the combining element, embodied as a combining grating 315, in the scanning unit 310. As in the foregoing embodiments of FIGS. 2-6 and 8-15, the combining element 315 is disposed on the second carrier element 312B.

Analogously to the embodiments of FIGS. 1-6 and 8-15, the two carrier elements 312A, 312B oriented perpendicular to the measurement reflector 300 are embodied as glass plates, as is the additional, third carrier element 330 provided here. Because of the orientation of the carrier elements 312A, 312B and 330, all the elements disposed on them, that is, the various deflection elements 330.1, 330.2, as well as the splitter grating 311 and combining grating 315, are likewise disposed perpendicular to the surface of the measurement reflector 300.

The reference beam R resulting as a +1$^{st}$ order of diffraction at the splitter grating 311 is first propagated in the direction of the first deflection element 330.1, which is disposed on the middle carrier element 330. Because of the identical angle of incidence of the measurement beam M and reference beam R, the first deflection element 330.1 performs the identical optical actions on the incident reference beam R as it does, as explained above, on the incident measurement beam M. As a result, besides the deflection action in the measuring direction z, there is accordingly the aforementioned focusing action onto a linear focus L in the middle of the third carrier element 330.

From the first deflection element 330.1, the thus-affected reference beam R is then propagated to the second deflection element 330.2, which is disposed on the opposite side of the third carrier element 330. The result for the reference beam R striking that carrier element parallel to the light incidence direction x is accordingly once again a deflection effect toward the bottom right in the direction of the combining element 315. Moreover, the reference beam R striking the second deflection element 330.2 divergently is collimated by that deflection element. In other words, the collimated reference beam R is propagated in the direction of the combining element 315.

As in the embodiments explained above with respect to FIGS. 2-6 and 8-15, the reference beam R between the splitter grating 311 and the combining element 315 is propagated solely in the scanning unit 310.

At the combining element 315, the reference beam R and measurement beam M meet at oppositely symmetrical angles of incidence and come into interferential superposition there.

In the event of changes in spacing between the measurement reflector 300 and the scanning unit 310 in the measuring direction z, a periodic scanning signal that is available for further processing can be detected via the detector arrangement 318 downstream of the combining grating 315. In order to have information available about the direction of a change in spacing as well, it is advantageous to generate a plurality of phase-shifted scanning signals. For instance, as already mentioned above, three scanning signals phase-shifted by 120° each, or four scanning signals phase-shifted from one another by 90° each, can be generated.

As seen in FIG. 16, between the splitter grating 311 and the combining element 316 the measurement beam M passes four times through the glass plate 340 that closes off the scanning unit 310 in the direction of the measurement reflector 300. To compensate for the resultant altered optical path of the measurement beam M, two compensation elements 341.1, 341.2 in the form of glass plates are also disposed in the beam path of the reference beam R in the scanning unit. Since the reference beam R passes precisely once through the compensation element 341.1 and likewise precisely once through the compensation element 341.2, each of the compensation elements 341.1, 341.2 has twice the thickness of the glass plate 340. In this way, the measurement beam M and the reference beam R travel identical distances through the glass in the scanning unit 310. Phase differences in the beams M, R are due solely to changes in spacing between the measurement reflector 30 and the scanning unit 310, since the measurement beam M shifts relative to the deflection elements 330.1, 330.2.

Alternatively to the embodiment described, it would also be possible in a modified variant to embody the first and second deflection elements 330.1, 330.2 each in two parts. In other words, each of the first and second deflection elements is not a single transmission grating extending in the z direction but instead the deflection elements are in the form of two transmission gratings each, which are provided only locally, in the vicinity of the impact sites of the measurement beam M and the reference beam R.

It is also conceivable to dispose the deflection elements 330.1, 330.2 separately on two thin glass plates which are placed to the left and right of the center of symmetry of the arrangement, oriented perpendicular to the measurement reflector 300. The spacing of these two glass plates should then be chosen such that the optical paths of the beams between the first and second deflection elements 330.1, 330.2 would be identical to the case of the above-described embodiment having the thick glass plate as third carrier element 330.

Figure 17:
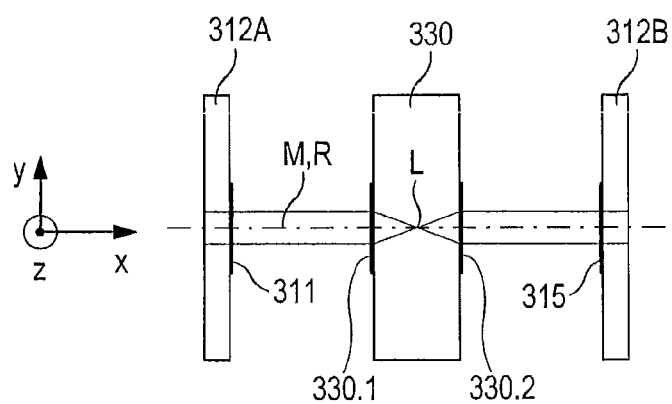
FIG. 17 is a sectional view of the beam path of the device of FIG. 16.
Figure 18:
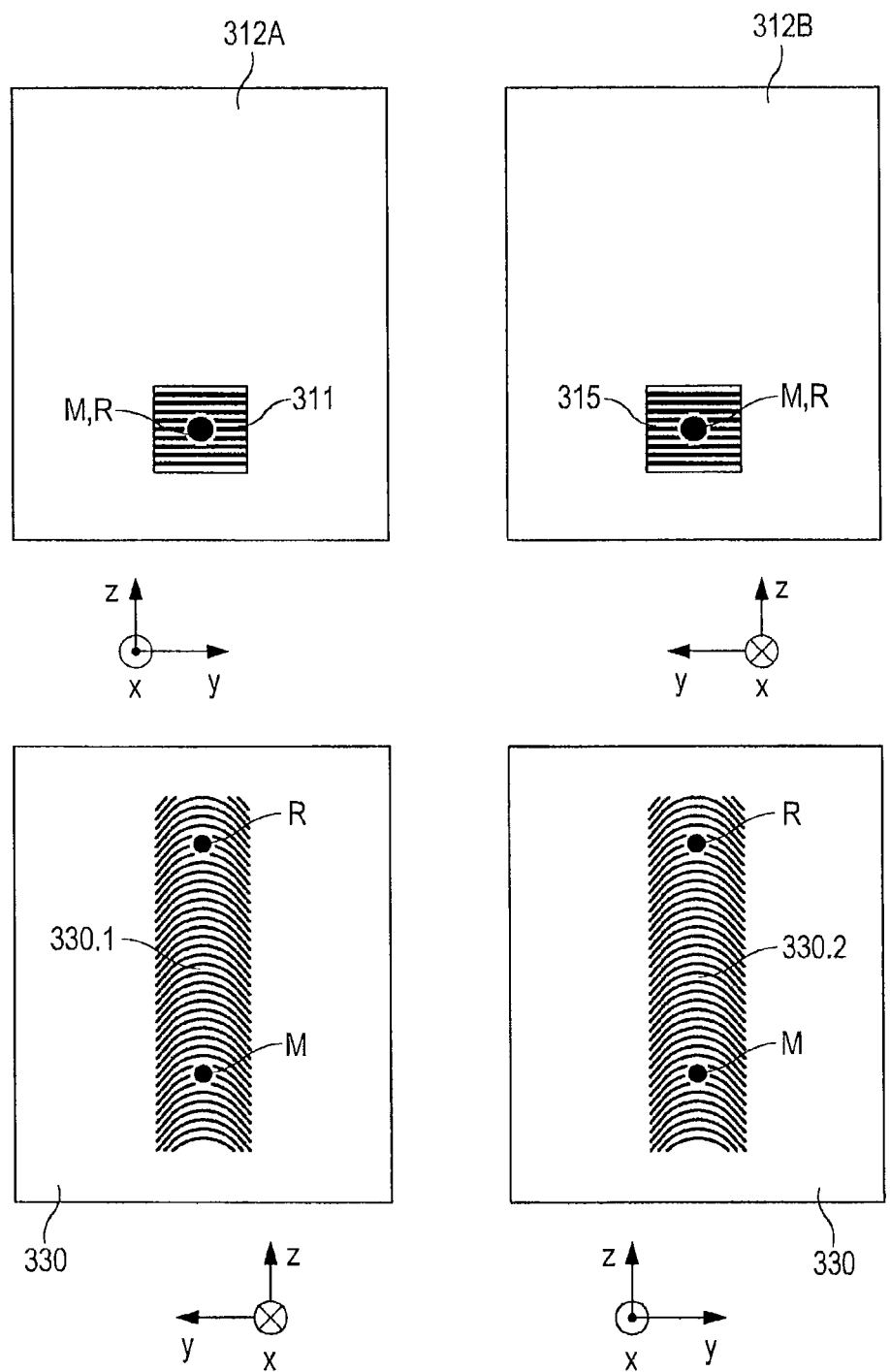
FIG. 18 shows several top views onto various elements of the device of FIGS. 16-17t.

It should be mentioned as an advantage of the fourth embodiment of the device of the present invention shown in FIGS. 16-18 that a scanning unit that is much more compact in the z direction than in the foregoing variants. Another advantage is greater invulnerability to possible tilting of the measurement reflector 300, since if tilting of the measurement reflector 300 occurs, the relative displacements of the measurement beam and reference beam at the site of the interference are less.

Besides the embodiments of FIGS. 2-6 and 8-15 described previously, it is understood that there are still further possibilities for alternative designs of the device of the present invention for interferential distance measurement.

In all the embodiments described with respect to FIGS. 2-6 and 8-15, for reasons of symmetry, the same imaging optical elements and optical functionalities in the deflection elements are provided in the beam path of the reference beam as in the measurement beam. Since tilting of the measurement reflector has no influence on the reference beam, in further possible embodiments the deflection elements in the beam path of the reference beam could also be embodied as purely deflecting elements, without any additional optical functionality.

Moreover, the combining element need not be embodied as a combining grating as in the embodiments described with respect to FIGS. 2-6 and 8-15. It would also be fundamentally conceivable, within the scope of the present invention, to provide a suitable beam splitter, for example, as a combining element at this point instead.

Finally, as an equivalent to the versions described, beam paths are feasible in which the light source and the gratings are located in virtual form at the same points as in the embodiments described of FIGS. 2-6 and 8-15. This could be attained for instance by additional mirroring elements in the beam path, and so forth.

The foregoing description is provided to illustrate the present invention, and is not to be construed as a limitation. Numerous additions, substitutions and other changes can be made to the invention without departing from its scope as set forth in the appended claims.

We claim:

1. A device for interferential distance measurement, comprising:
   a measurement reflector comprising a single surface;
   a light source emitting a beam parallel to said surface;
   a splitter element comprising a splitter grating that is disposed perpendicular to said surface, wherein said splitter grating receives said beam and splits said beam into a measurement beam and a reference beam, wherein said measurement beam reflects acting at least twice upon said single surface of said measurement reflector along a path of said measurement beam;
   a combining element, at which said measurement beam and said reference beam enter into interferential superposition to form interfering measurement and reference beams; and
   a detector arrangement, by way of which a plurality of phase-shifted, periodic scanning signals pertaining to a distance between said measurement reflector and a component of said device in a measuring direction are generated from said interfering measurement and reference beams.

2. The device according to claim 1, wherein said light source, said splitter grating, said combining element and said detector arrangement are disposed in a scanning unit, which is disposed at variable distances relative to said measurement reflector, at least in said measuring direction.

3. The device according to claim 2, wherein a reference beam propagates solely in said scanning unit between said splitter grating and said combining element.

4. The device according to claim 1, further comprising a plate-like carrier element, wherein said splitter grating is disposed on said plate-like carrier element, and said carrier element is oriented perpendicularly to said single surface of said measurement reflector.

5. The device according to claim 1, further comprising:
   two first deflection elements disposed along a path of said reference beam and between said splitter grating and said combining element, wherein via each of said two first deflection elements there is a resultant deflection on a beam incident thereon either in said measuring direction or in said measuring direction and in a direction perpendicular to said measuring direction; and
   two second deflection elements disposed along said path of said measurement beam and between said splitter grating and said combining element, wherein via each of said two second deflection elements there is a resultant deflection on a beam incident thereon either in said measuring direction or in said measuring direction and in said direction perpendicular to said measuring direction.

6. The device according to claim 5, wherein said two first deflection elements and said two second deflection elements result in: 1) a collimated beam striking said first deflection elements or said two second deflection elements undergoing a focusing effect on a linear focus that extends in said measuring direction; and 2) a resultant collimating effect on a divergent beam striking said first deflection elements or said two second deflection elements.

7. The device according to claim 6, wherein said two first deflection elements and said two second deflection elements are embodied as reflective cylindrical Fresnel lenses, and via said reflective cylindrical Fresnel lenses, there is not only a resultant focusing effect, but, in addition, a resultant deflection effect in said measuring direction upon an incident beam.

8. The device according to claim 7, wherein via said two first deflection elements there is a resultant focusing action on an incident beams onto a linear focus.

9. The device according to claim 7, wherein via said two second deflection elements there is a resultant focusing action on an incident beam onto a linear focus.

10. The device according to claim 6, wherein said two first deflection elements are embodied as two first transmissive cylindrical Fresnel lenses that are disposed together with a first reflector on a first carrier element, wherein said first transmissive cylindrical Fresnel lenses are disposed on a first side of said first carrier element and said first reflector is disposed on a second side of said first carrier element that is opposite to said first side of said first carrier element, and wherein a reflective side of said first reflector is oriented in a direction of said first transmissive cylindrical Fresnel lenses, and wherein said first transmissive cylindrical Fresnel lenses are embodied such that a collimated beam striking them undergoes a linear focusing onto said reflective side of said first reflector; and
   wherein said two second deflection elements are embodied as two second transmissive cylindrical Fresnel lenses that are disposed together with a second reflector on a second carrier element, wherein said second transmissive cylindrical Fresnel lenses are disposed on a first side of said second carrier element that faces said first side of said first carrier element, and wherein said second reflector is disposed on a second side of said second carrier element that is opposite to said first side of said second carrier element, and wherein a reflective side of said second reflector is oriented in a direction of said second transmissive cylindrical Fresnel lenses, and wherein said second transmissive cylindrical Fresnel lenses are embodied such that a collimated beam striking them undergoes-a linear focusing onto said reflective side of said second reflector.

11. The device according to claim 6, wherein said two first deflection elements are embodied as first reflective off-axis cylindrical Fresnel lenses that are disposed on a side of a first carrier element; and wherein said two second deflection elements are embodied as second reflective off-axis cylindrical Fresnel lenses that are disposed on a side of a second carrier element that faces said side of said first carrier element.

12. The device according to claim 5, wherein said two first deflection elements and said two second deflection elements comprise diffractive structures, which are disposed on carrier elements that are disposed perpendicularly to said measurement reflector.

13. The device according to claim 5, wherein said first deflection elements are embodied as first transmissive cylindrical Fresnel lenses, which are disposed on a first side of a plate-like carrier element that is placed between two outer plate-like carrier elements that have said splitter grating and said combining element are disposed thereon; and wherein said second deflection elements are embodied as second transmissive cylindrical Fresnel lenses, which are disposed on a second side of said plate-like carrier element that is opposite to said first side of said plate-like carrier element.

14. The device according to claim 13, wherein components in a scanning unit are disposed and embodied such that:

said measurement beam is propagated from said splitter grating in a direction toward a first impact site of said measurement reflector and at which first impact site said measurement beam undergoes a first reflection in a direction toward one of said first deflection elements that is in said scanning unit; and at said one of said first deflection elements, said measurement beam undergoes a deflection in a direction toward one of said second deflection elements; and at said one of said second deflection elements, said measurement beam undergoes a deflection in a second direction toward a second impact site of said measurement reflector and at which said second impact site undergoes a second reflection in a direction toward said combining element;

said reference beam is propagated from said splitter grating in a direction toward said one of said first deflection elements at which said reference beam undergoes a deflection in a direction toward said one of said second deflection elements; and at said one of said second deflection elements, said reference beam undergoes a deflection in the direction of said combining element.

15. The device according to claim 1, wherein a path of said measurement beam that lies between said splitter grating and said combining element extends mirror-symmetrically to a plane of symmetry that is oriented perpendicularly to said single surface; and wherein a path of said reference beam that lies between said splitter grating and said combining element extends mirror-symmetrically to said place of symmetry.

16. The device according to claim 1, wherein said combining element comprises a combining grating and is disposed perpendicularly to said single surface of said measurement reflector.

17. The device according to claim 1, wherein said distance is determined by said device independent of a wavelength of said beam emitted by said light source.

18. The device according to claim 1, wherein said distance is determined by said device independent of a change of a wavelength of said beam emitted by said light source.

* * * * *